US007451867B2

(12) United States Patent
Berger et al.

(10) Patent No.: US 7,451,867 B2
(45) Date of Patent: Nov. 18, 2008

(54) ESCALATOR OR MOVING WALK WITH SHAFT-BEARING AND METHOD OF MOUNTING AND DISMOUNTING THIS ESCALATOR

(75) Inventors: Michael Berger, Vienna (AT); Robert Ulrich, Bruckneudorf (AT)

(73) Assignee: Inventio AG, Hergiswil (CH)

( * ) Notice: Subject to any disclaimer, the term of this patent is extended or adjusted under 35 U.S.C. 154(b) by 38 days.

(21) Appl. No.: 11/177,709

(22) Filed: Jul. 8, 2005

(65) Prior Publication Data

US 2006/0006046 A1 Jan. 12, 2006

(30) Foreign Application Priority Data

Jul. 12, 2004 (EP) .................................. 04016318

(51) Int. Cl.
*B65G 23/24* (2006.01)
*B66B 23/16* (2006.01)
*B66B 21/00* (2006.01)
*B66B 23/02* (2006.01)

(52) U.S. Cl. ....................................... 198/330; 198/329

(58) Field of Classification Search ................. 198/330, 198/329, 322

See application file for complete search history.

(56) References Cited

U.S. PATENT DOCUMENTS

| | | | | | |
|---|---|---|---|---|---|
| 1,956,153 | A * | 4/1934 | Lindquist et al. | ............ | 198/322 |
| 2,253,386 | A * | 8/1941 | McCormick | ................ | 198/331 |
| 2,649,181 | A * | 8/1953 | Hansen | ....................... | 198/329 |
| 3,419,127 | A * | 12/1968 | Yost | ........................... | 198/329 |
| 4,535,880 | A * | 8/1985 | Boltrek | ....................... | 198/330 |
| 5,224,580 | A * | 7/1993 | Nurnberg et al. | ............ | 198/330 |
| 5,950,797 | A * | 9/1999 | Aulanko et al. | ............. | 198/330 |
| 6,119,845 | A * | 9/2000 | Song | .......................... | 198/331 |
| 6,260,687 | B1 | 7/2001 | Ulrich | | |
| 6,273,235 | B1 | 8/2001 | Inoue | | |
| 6,974,018 | B2 * | 12/2005 | Lunardi et al. | .............. | 198/331 |
| 2002/0148703 | A1 | 10/2002 | Ulrich et al. | | |

* cited by examiner

*Primary Examiner*—Gene O. Crawford
*Assistant Examiner*—Ramya G Prakasam
(74) *Attorney, Agent, or Firm*—Schweitzer Cornman Gross & Bondell LLP

(57) ABSTRACT

An escalator and moving walk shaft mounting construction and method utilizes a truss, a shaft and a shaft-bearing to hold the shaft in the truss. The shaft bearing has a hub and a socket. The hub is affixed to the truss, while the socket interfits with the hub to hold the shaft. The hub-socket connection can be severed to release the shaft from the hub.

8 Claims, 4 Drawing Sheets

ESCALATOR OR MOVING WALK WITH SHAFT-BEARING AND METHOD OF MOUNTING AND DISMOUNTING THIS ESCALATOR

The present invention relates to an escalator or moving walk with a truss, a shaft, and a shaft-bearing for holding the shaft in the truss and in particular to a construction for the shaft and shaft-bearing and a method for mounting and dismounting the escalator shaft in the escalator or moving walk.

BACKGROUND OF THE INVENTION

In the description that follows, the term "escalator" is inteded to include moving walks, and the term "step" shall also include pallets of moving walks, irrespective of whether the latter terms are specifically maintained.

The steps of a conventional escalator are fastened to two transporting chains together to form an endless circulating step-loop which, at each end of the escalator, runs over a pair of transporting-chain wheels. One of the pairs of transporting-chain wheels belongs to a drive station and drives and reverses the step-loop, and the other pair of chain wheels being part of a step-loop reversing station. The individual steps of the step-loop are each equipped with two front guide rollers and two rear guide rollers on which the steps are guided in a position-dependent defined position by means of guiderails and cams or reversing curves which are primarily fastened to the supporting construction of the escalator.

At the upper stairhead of an escalator or moving walk with a balustrade a main shaft is built in. The main shaft is borne in the truss at its left and right sides. The manner of being borne must be executed as simply as possible since, should bearing damage occur, the main shaft must be dismounted from the escalator.

The main shaft drives the steps or which are guided on the rails. To make driving the steps easier, the main drive is, for example, executed as a hollow-shaft construction. In this hollow-shaft construction, the main shaft consists of a stationary axle which is held in bearings in the truss of the escalator. Around this axle a rotating hollow shaft is mounted which is connected to the axle through rolling-contact bearings. This hollow axle rotates and carries the step-loop or pallet-loop. The axle which carries the hollow shaft is typically fastened tightly to the truss with screws.

The described embodiment has the disadvantage that in the case of, for example, a defective rolling-contact bearing, extensive dismantling and installation work is necessary, since the rolling-contact bearings can only be dismounted and remounted by moving them lengthwise to the end of the axle. To pull the rolling-contact bearings and the hollow shaft out, the stationary axle must be dismounted from the truss, which is laborious and time-consuming, especially in consideration of the weight of such an axle (500 kg). The call for short interruption times for correction of every type of possible defect cannot be met with such a construction.

Mounting of the shaft takes place when the escalator is installed. Dismounting of the shaft takes place when the escalator is maintained. Installation and maintenance are two different steps in the value chain.

The purpose of the present invention is to avoid the aforesaid disadvantage in an escalator or moving walk, i.e. to enable replacement of a defective rolling-contact bearing or of any other component in substantially less time.

A further purpose of the present invention is to enable simpler and faster mounting and dismounting of the shaft of an escalator or moving walk, using as few components as possible, thereby bringing about a reduction in installation costs.

BRIEF DESCRIPTION OF THE INVENTION

The foregoing and other purposes of the invention are fulfilled by an escalator or moving walk consisting of a truss, a shaft, and at least one shaft-bearing by which the shaft is borne in the truss. The shaft-bearing consists of a hub and a socket, the hub being tightly fastened to the truss and the socket holding the shaft on the hub.

Since the socket holds the shaft on the hub, the shaft can be quickly and easily dismounted by the socket being removed, i.e. pushed along the shaft. A quick and easy mounting operation is effected by the reverse operation or execution.

Through the uncomplicated, simple mounting and dismounting operation, valuable worktime can be saved. Because of the small number of parts and the simple production of the parts, this shaft-bearing is very economical. The new shaft-bearing is correspondingly simpler, lighter, cheaper, and less complicated. Fast and simple mounting and dismounting, and the small number of parts, are additional advantages of the new shaft-bearing.

According to an expedient embodiment of an escalator according to the invention, the socket is arranged on the end of the shaft. This positioning of the socket enables optimal transmission of the load of the shaft to the truss of the escalator.

In accordance with an even more advantageous embodiment of the invention, a socket is arranged at each end of the shaft. The load of the shaft is thereby constantly transmitted to the left and right side of the truss in a balanced manner.

A particularly advantageous embodiment of the invention may result if the shaft is executed as a hollow-shaft construction. Under these circumstances, the hollow shaft can be very quickly and easily dismounted and pulled off the stationary axle.

A further advantageous embodiment of the invention may encompass the hub being connected to the truss by positive fit, non-positive fit, or material bonding. By this means, the maximum strength of the mechanical connection between the hub and the truss may be obtained.

According to a further embodiment of the invention, the socket is so configured that it can be pulled onto, or placed on, or pulled over the hub. This enables an optimized mechanical adaptation between hub and socket to be obtained.

The invention further encompasses a method for mounting an escalator or moving walk shaft. By means of a shaft-bearing, a shaft of an escalator or moving walk is borne in a truss, a hub of the shaft-bearing being tightly fastened to the truss, a socket of the shaft-bearing being set on the shaft, the shaft being positioned in a defined position, and the socket being pushed along the shaft onto the hub and connected to the hub.

Since the socket is pushed along the shaft onto, and connected with, the hub, the shaft can be mounted quickly and easily.

The shaft can be dismounted by a similar method. The shaft of an escalator or moving walk which is tightly fastened to a truss by means of a shaft-bearing is dismounted by the socket of the shaft-bearing being released from a hub of the shaft-bearing and the socket being pushed along the shaft away from the hub.

By this means the shaft can be quickly and easily dismounted by the socket being pushed along the shaft away from the hub.

BRIEF DESCRIPTION OF THE DRAWINGS

A fuller understanding of the invention will be obtained upon consideration of the description of exemplary embodiments of the invention which follow and as shown in the annexed FIGS. 1 to 4, wherein.

DETAILED DESCRIPTION OF THE INVENTION

Figure 1:
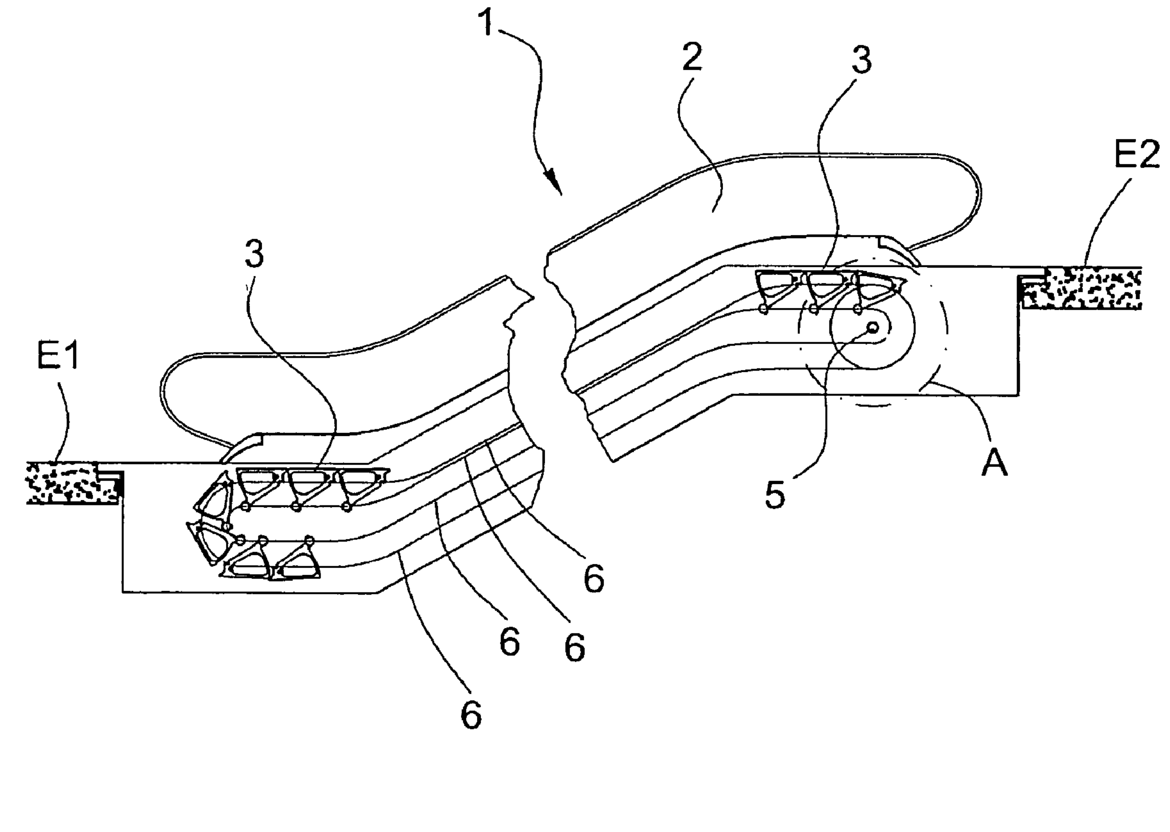
FIG. 1 shows a general arrangement of an escalator in accordance with the invention.

In FIG. 1 the essential components of an escalator or moving walk 1 are shown diagrammatically. Integrated into an escalator supporting construction is a circulating endless step-loop which is driven by a drive unit via a transport-chain drive-wheel unit.

Particularly visible in FIG. 1 are the escalator 1 with a balustrade 2, steps 3, and truss 4. Built into the upper stair head of the escalator is a shaft 5. In the present invention the mounting of the shaft 5 is simpler and the truss 4 can be made narrower than in conventional constructions. The shaft 5 is visible in the upper part of the escalator 1.

Figure 2:
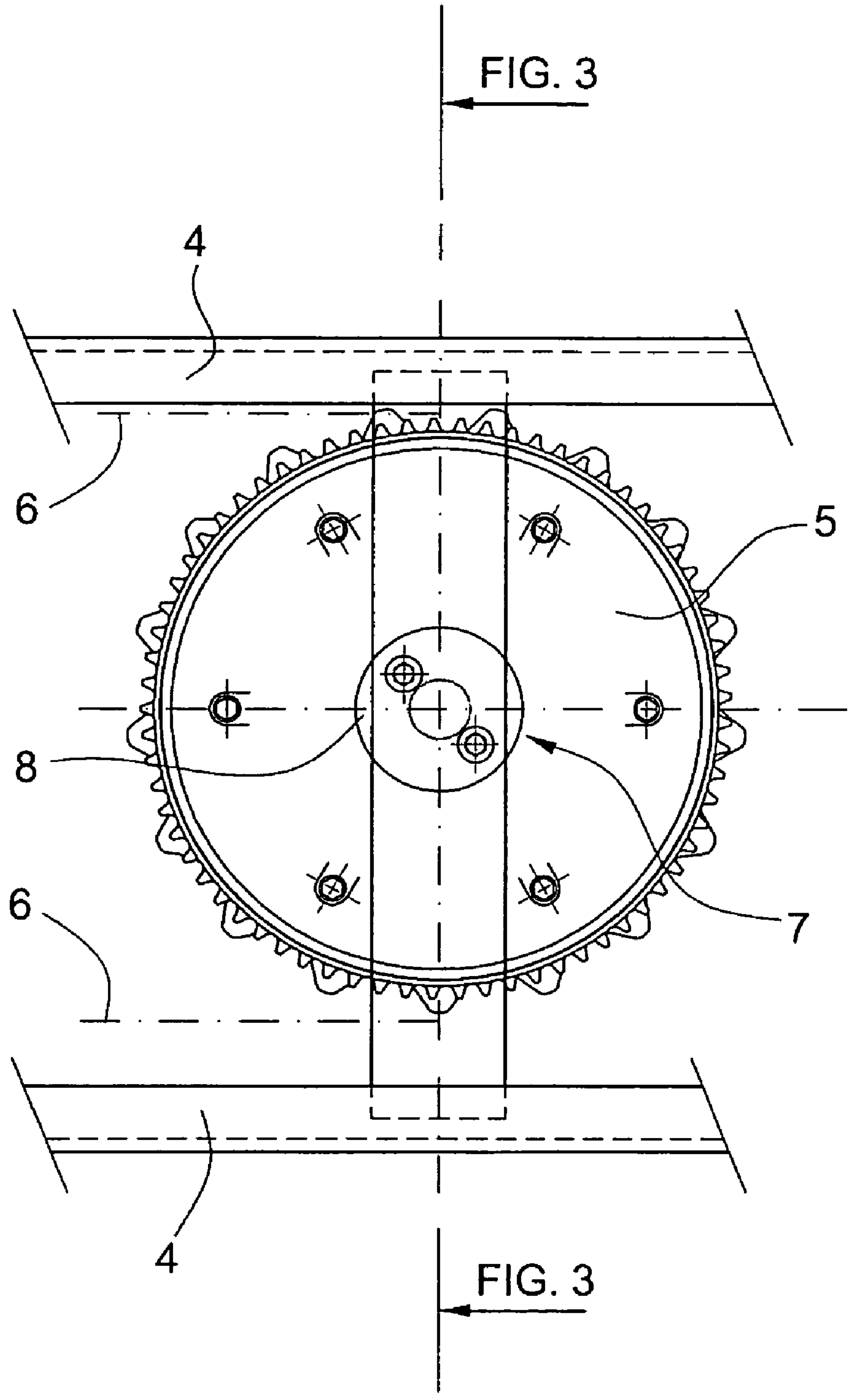
FIG. 2 is a detail of the area shown in FIG. 2 of the upper part of the escalator.

In FIG. 2 a shaft-bearing 7 at the upper end (head) of the escalator 1 can be seen, as well as the shaft 5, the truss 4, and guiderails 6. Also visible in the upper part of the escalator 1 is a hub 8.

Figure 3:
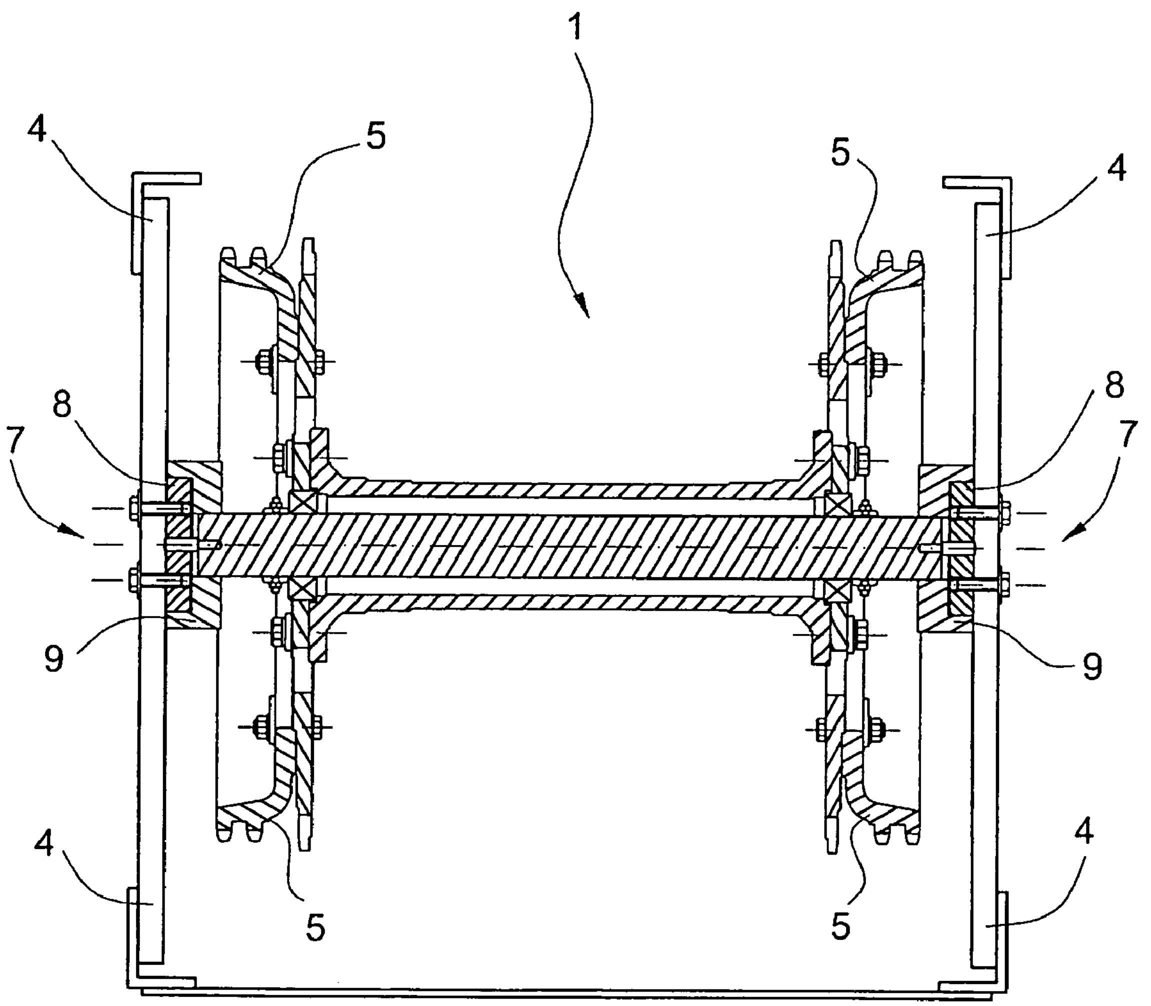
FIG. 3 is a view of the area shown in FIG. 2 in cross-section.

In FIG. 3 the shaft 5 is seen in a full cross-section, the hub 8 and socket 9 being capable of being moved along the shaft. The shaft 5 is executed as a hollow-shaft construction. According to this hollow-shaft construction, the shaft comprises a stationary axle which is borne by the truss of the escalator. Arranged around this axle is a rotating hollow shaft which is connected to the axle through rolling-contact bearings. This hollow axle rotates and bears the step-loop. The axle which bears the hollow shaft must be tightly fastened to the truss. In this exemplary embodiment the shaft 5 is the main shaft of the escalator, i.e. the shaft on which the driving force is exerted.

Figure 4:
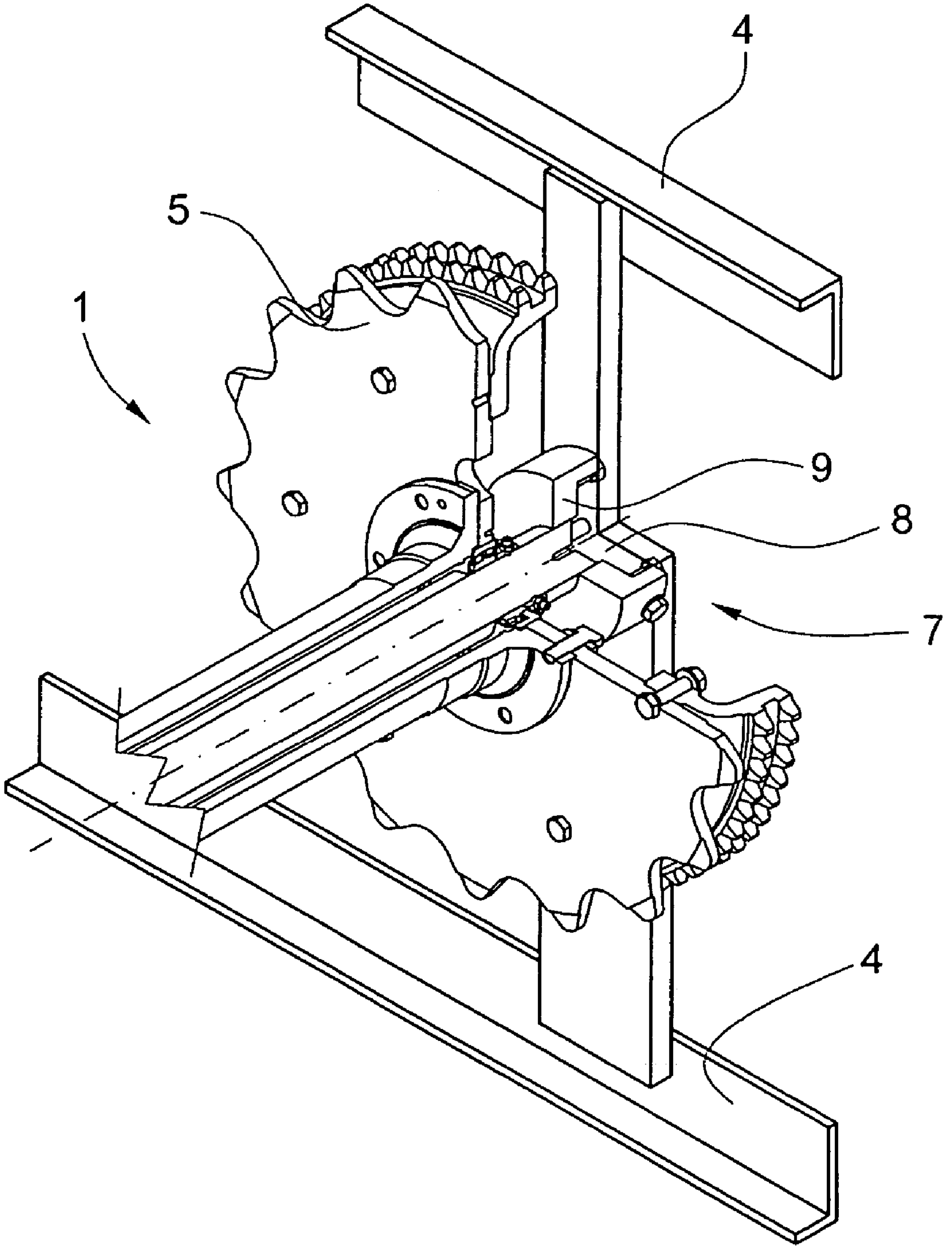
FIG. 4 is an oblique view of the upper part of the escalator from FIG. 2.

In FIG. 4 the shaft-bearing 7 is seen as a quarter section, with the hub 8 and socket 9 as well as the shaft 5 and truss 4.

As Illustrated, the escalator 1 or moving walk has truss 4, shaft 5, and shaft-bearing 7 by which the shaft 5 is borne in the truss 4, the shaft-bearing 7 consisting of a hub 8 and socket 9, the hub 8 being tightly fastened to the truss 4 and the socket 9 holding the shaft 5 on the hub 8.

The shaft-bearing 7 is formed of a small number of parts. The hub 8 can be connected to the truss 4 by a positive fit, a non-positive fit, or by material bonding (e.g. screwed, pinned or welded). This very massive hub 8 takes on the supporting function for the main shaft 5, typically weighing up to 500 kg. Pulled onto or placed on or pulled over the hub 8, and thereby holding the main shaft 5, is the socket 9. The hub 8 is thus connected to the truss 4, while the socket 9 rests on, and is supported by, the hub 8. The main shaft 5 is in turn held, or borne, by the socket 9.

The main shaft 5 is preferably borne at its left and right ends in the truss 4. A socket 9 is attached to each end of the shaft. This bearing must be executed as simply as possible since, in the event of a defective bearing, the main shaft 5 must be dismounted.

The new shaft-bearing 7 performs several tasks simultaneously. It consist of few parts and simplifies its dismounting.

The main shaft 5 drives the steps or pallets 3 which are guided on guiderails 6. To make driving the steps or pallets 3 easier, the main shaft 5 is preferably executed as a hollow-shaft construction.

The shaft 5 of the elevator or moving walk, which is tightly connected by the shaft-bearing 7 to the truss 4, may be dismounted by the socket 9 of the shaft-bearing 7 being separated from the hub 8 of the shaft-bearing 7 and the socket 9 being pushed along the shaft 5 away from the hub 8. The shaft is thus freed from its truss mounting for service, repair or replacement.

The present invention represents a significant simplification of the shaft dismounting method since the shaft-bearing 7 is more simply constructed than formerly and, through the socket-and-hub principle, can be dismounted more rapidly. The dismounting work and the downtime of the escalator for replacement of a main shaft are thereby substantially reduced.

The advantages when dismounting are self-evident. It is only necessary to push the socket 9 off the hub 8 (push fit, push seating, slide fit, slide seating) and the main shaft 5 is completely freely movable and can be dismounted and exchanged.

When mounting the main shaft 5, the principle functions exactly in reverse. The socket 9 is simply pushed over the hub 8. Accordingly, the shaft 5 of the escalator or moving walk is held in the shaft-bearing 7 in the truss 4 through the hub 8 of the shaft-bearing 7 being tightly fastened to the truss 4, the socket 9 of the shaft-bearing 7 being placed on the shaft 5, the shaft 5 being positioned in a definite position, and the socket 9 being pushed along the shaft onto the hub 8 and connected to the hub 8.

By this means the main shaft 5 is connected via the hub 8 to the truss 4. The main shaft 5 is now fully assembled and built in. Bearing forces can now be transferred from the main shaft 5 via the socket 9 to the hub 8. The hub 8 conducts the bearing forces into the truss 4 or transfers the bearing forces to the truss 4.

We claim:

1. An escalator or moving walk, comprising:

a truss, a shaft construction having a hollow rotatable shaft and a stationary axle extending through the hollow rotatable shaft, and a shaft-bearing for holding the shaft in the truss, the shaft-bearing comprising a hub and a socket, the hub being tightly fastened to the truss and supporting the socket, the axle being borne by the socket whereby an end of the axle is engaged and supported by the socket, the axle having a distal portion of a first cross-section capable of passing through the socket extending from the end inwardly to an inner edge of the engaged socket and for a further distance such that the socket is capable of being moved inwardly along the first cross-section portion to a position such that an outer edge of the socket is inward of an inner edge of the hub for separation and clearance from the hub without interference from the hub, the hub being constructed to permit the socket to be moved inwardly along the axle out of engagement with the hub to the position.

2. The escalator or moving walk according to claim 1, characterized in that the distal portion of the axle is of a consistent cross-section.

3. The escalator or moving walk according to claim 1 or 2, characterized in that the socket is arranged on an end of the shaft.

4. The escalator or moving walk according to claim 1 or 2, characterized in that the shaft-bearing comprises two sockets, each arranged on an opposed end of the shaft.

5. The escalator or moving walk according to claim 1 or 2, characterized in that the hub is connected by one of a positive fit, non-positive fit, or material bonding to the truss.

6. The escalator or moving walk according to claim 1 or 2, characterized in that the socket is so configured that it can be pulled onto, placed on, or pulled over the hub.

7. A method of supporting a shaft construction of an escalator or moving walk by a shaft-bearing in a truss, comprising the steps of:

tightly fastening a hub of the shaft-bearing to the truss;

placing a socket of the shaft-bearing on a section of an axle of the shaft construction having a cross-section capable of being received by the socket at a location inward of a location of intended engagement between the axle and hub whereby an outer edge of the socket is inward of an inner edge of the hub;

positioning the shaft construction for support by the shaft-bearing with the socket at the location to provide clearance with respect to the hub;

pushing the socket along the section of the axle outwardly onto the hub; and connecting the socket to the hub.

8. A method of dismounting a shaft construction of an escalator or moving walk which is tightly fastened by means of a shaft-bearing to a truss, comprising the steps of;

releasing a socket of the shaft-bearing from a hub of the shaft-bearing; and pushing the socket along a length of an axle having a cross-section capable of being received by the socket away from the hub to a clearance position wherein an outer edge of the socket is inward of an inner edge of the hub to free the shaft from the hub.

* * * * *